Jan. 20, 1925.  
J. HARRIS  
TANK VALVE  
Filed Dec. 1, 1920  
1,523,981
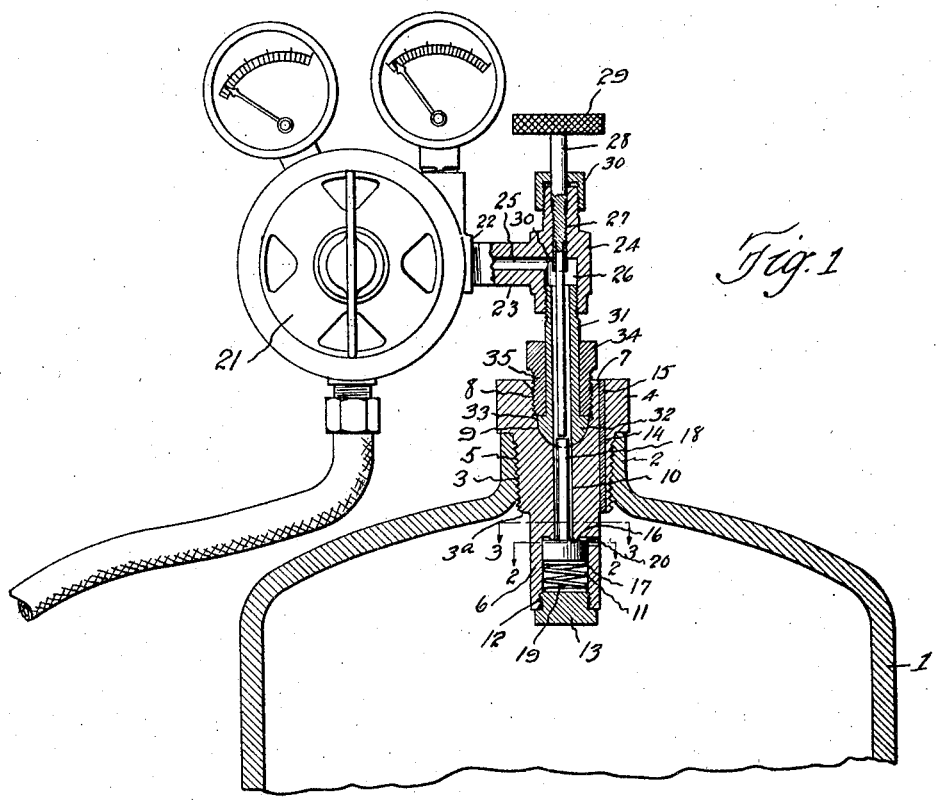
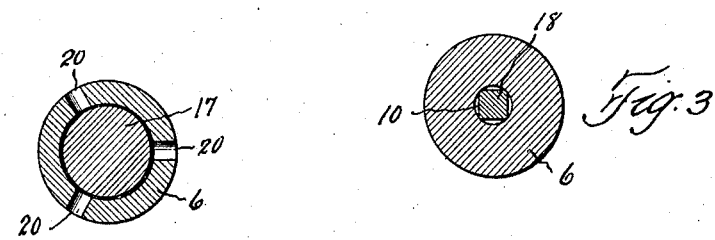

Patented Jan. 20, 1925.

1,523,981

UNITED STATES PATENT OFFICE.

JOHN HARRIS, OF LAKEWOOD, OHIO.

TANK VALVE.

Application filed December 1, 1920. Serial No. 427,517.

*To all whom it may concern:*

Be it known that I, JOHN HARRIS, a citizen of the United States, residing at Lakewood, in the county of Cuyahoga and State of Ohio, have invented a certain new and useful Improvement in Tank Valves, of which the following is a full, clear, and exact description, reference being had to the accompanying drawings.

This invention relates to valves that are employed with tanks or cylinders for high pressure gases and to the cooperating mechanism for opening said valves and for regulating the pressure of the gases discharged therethrough. Instances of such gases are carbon dioxide, nitrogen, oxygen and acetylene. These tanks or cylinders are used in connection with regulators, and are each provided with a valve which is adapted for connection with such regulators. These valves, as usually constructed and installed, comprise each a valve fitting which is threaded into the top of a tank and is provided with one or more threaded extensions for connection with the regulator; also with a valve operating stem having an exposed handle for opening its valve. In order to prevent injury to the threaded portions and to make it inconvenient to open the valves while the tanks are in transit, the tops of the tanks are provided each with an externally threaded spud or seat surrounding the valve and a protecting hood is threaded onto this seat.

The general purpose and object of my invention is to provide tanks of this character with valves located entirely within the tank and not readily accessible during shipment of the latter and having no such projecting parts as require the use of such hoods; to so construct the said valves as to enable them to be connected to, and cooperate in a most efficient manner with, valve opening means carried by a regulator; and generally to reduce the cost of production and increase the efficiency and convenience of operation of valves of this character. I accomplish these objects in and through the construction and arrangement of parts shown in the drawings forming a part hereof, wherein Fig. 1 represents a vertical sectional view through the upper portion of a high pressure gas cylinder having my valve mechanism connected thereto, a regulator being shown in elevation; and Figs. 2 and 3 are sectional details corresponding respectively to the lines 2—2 and 3—3 of Fig. 1.

Describing the various parts by reference characters, 1 denotes the upper portion of the tank or cylinder having a neck 2 provided with an internal thread 3. Mounted in this neck is a valve body or block comprising an upper head 4 which may be shaped to receive a wrench, an intermediate externally threaded neck 5, and a lower reduced portion 6. The valve block is bored out in its upper central portion, providing a chamber having an outwardly and upwardly flared or beveled upper portion 7, a threaded intermediate portion 8, and a concave lower portion 9. From the bottom of the chamber there extends a bore 10 opening at its lower end into a chamber 11, preferably cylindrical and having its lower end provided with a thread 12 for the reception of a plug 13. In addition to the bore 10, the body is provided with a bore 14 substantially parallel with the bore 10 and extending from the top of the body through the shoulder 3ª which is provided at the bottom of the neck 3. This bore is filled with fusible metal, constituting a plug 15, which is adapted to blow out under a predetermined pressure—say 2,900 lbs. and temperature of not less than 170° F.

Surrounding the lower end of the bore 10 is an annular valve seat 16 and cooperating with said seat is a valve 17, said valve being located in the chamber 11 and having a stem 18, preferably angular in cross section and mounted within the bore 10. The valve 17 is normally held to its seat by means of a spring 19 interposed between it and the plug 13. The chamber 11 is provided with a plurality of ports 20 establishing communication with the interior of the cylinder 1 and normally assisting to seat the valve.

The valve assembly thus far described may be conveniently applied to the cylinder or tank by screwing the neck 5 into the neck 2, locking the assembly in place in any desired manner. As a further precaution, a plug not shown may be screwed into the thread 8 and may be locked and seated in place, to prevent any tampering with the valve 17 or its stem 18 when the tank is in shipment. For the purpose of connecting the cylinder or tank and its valve to a regulator and to provide means for operating the valve 17, the following construction is provided:—

21 denotes a regulator of any approved design having an internally threaded connection 22; threaded into said connection is a T-fitting comprising a stem 23 and a body 24 extending transversely of said stem. The stem of said T is provided with a passageway 25 communicating at one end with the appropriate portion of the regulator and at its opposite end with a central chamber 26. A threaded bore 27 extends away from this chamber and provides a mounting for a valve stem 28 which is threaded therein, the said stem having an operating wheel 29 and projecting through a stuffing box 30. The stem is reduced and is provided within the chamber 26 with a collar 30' rigidly secured thereto and adapted to abut against the top of the chamber to prevent the unscrewing of said stem; also to prevent, when seated, leakage through the stuffing box and the bore 27.

Threaded into the lower end of the T is a connecting member comprising generally a tubular body 31 having at its lower end a head 32 conforming to the seat formed by the rounded lower portion 9 of the chamber in the valve body and forming a ground joint therewith. Between the upper end of the head 32 and the tubular body 31 is a shoulder 33. Slidably mounted upon said tubular body is a connecting member having at its upper end an operating head 34 shaped and adapted to receive an appropriate wrench or tool and being provided below such head with a threaded neck 35 cooperating with the threaded portion 8 of the valve-block chamber.

It will be understood that, when the cylinder and the valve assembly connected therewith are intended to be used, the plug (if used) which closes the chamber in the valve body will be removed, the head 32 will be applied to its seat 9, and the parts will be connected by screwing home the connecting member 34, 35. The lower end of the connecting member abuts against the shoulder 33 and forces the head 32 to a firm non-leaking connection with the concave seat. Then, by rotating the stem 28 in the appropriate direction, the valve 17 will be unseated and the gas may pass to the regulator through the duct comprising the member 31, chamber 26 and passageway 25, and its pressure controlled in the usual manner by the regulator.

Among the important advantages which are secured by my construction are the following:—

A. The elimination of exposed threads on the cylinder during shipment. Where a plug is not employed in connection with the thread 8 during shipment, the provision of the beveled surface 7 protects the said thread from injury.

B. The elimination of the protecting hood usually employed for valves of this character.

C. The elimination of valve stuffing boxes on the tanks or cylinders, and the location of the valve stem where liability of unintentional operation is reduced to a minimum.

D. The location of the valve within the tank and in such manner that the pressure of the gas in said tank helps to seat the valve, thus avoiding leakage.

E. The avoidance of leakage in and through the connections by which the gas is supplied to the regulator. This avoidance of leakage is facilitated by the ground joint between the parts 9 and 32; also by means of the collar 30' seating about the lower end of the bore 27, in the event there should be leakage through the valve 17.

F. Economy of production.

Having thus described my invention, what I claim is:

1. The combination, with a tank, of a valve block connected to said tank and having a passageway adapted to communicate at its inner end with said tank, the said block having a concave chamber extending from and about the outer end of said passageway, a valve cooperating with a seat at the inner end of said passageway, said valve having a stem projecting upwardly into said passage-way, means for normally holding said valve to said seat, a regulator having a connection provided with a passageway, said connection comprising a rounded head cooperating with the concave chamber, a connecting member cooperating with said valve block and said head to force the head to its seat, and a valve unseating member carried by such regulator connection, and adapted to contact with said valve stem to force said valve from its seat.

2. The combination, with a tank, of a valve block mounted in the said tank and having at its inner portion a chamber communicating with the interior of said tank, a passageway extending outwardly from said chamber, an outwardly enlarged chamber communicating with the outer end of said passageway, and having an internal thread therein, a valve mounted in the first chamber and cooperating with a seat surrounding the inner end of the passageway and having a stem mounted in said passageway, a regulator having a T projecting therefrom, one of the branches of the T having a chamber therein and the stem of the T having a passageway leading from the last named chamber to the regulator, a tubular member threaded into such last named chamber and having at its opposite end a head cooperating with the second named chamber, a sleeve reciprocably mounted on the tubular member and having a thread adapted to engage the thread in the valve block, and a stem reciprocably mounted in the opposite branch of said T and cooperating with the valve stem.

3. The combination, with a tank having a neck, of a valve block moutned in said neck, said valve block having a passageway extending inwardly from an outer chamber, the inner end of the passageway having a seat surrounding the same and the valve block having a chamber beyond said seat, the said chamber communicating with the said tank, a valve comprising a body mounted in said last named chamber and adapted to engage said seat and having a stem in said passageway, a spring cooperating with the fluid in the tank to seat said valve, the said outer chamber having a thread for securing thereto a connecting member for a regulator, and said connecting member having means adapted to extend into said passageway and contact with said valve stem to unseat said valve.

4. The combination, with a tank, of a valve block secured to said tank and having an outer chamber, said chamber being threaded and having an outwardly beveled portion extending beyond such threaded portion, said block having a passageway communicating at its outer end with said chamber and adapted to communicate at its inner end with said tank, and a valve controlling said passageway.

In testimony whereof, I hereunto affix my signature.

JOHN HARRIS.